Oct. 13, 1959 M. ROSENBERG ET AL 2,908,893

MAGNETIC-SWITCH CROSS-COUPLING MINIMIZATION SYSTEM

Filed March 28, 1955 2 Sheets-Sheet 1

MILTON ROSENBERG
WITOLD M. MODLINSKI
MATTHEW ARNOLD ALEXANDER
GEORGE F. MINKA
INVENTORS

BY Lyon & Lyon
ATTORNEYS

MAGNETIC-SWITCH CROSS-COUPLING MINIMIZATION SYSTEM

Filed March 28, 1955 2 Sheets-Sheet 2

MILTON ROSENBERG
WITOLD M. MODLINSKI
MATTHEW ARNOLD ALEXANDER
GEORGE F. MINKA
INVENTORS

BY Lyon & Lyon

ATTORNEYS

United States Patent Office 2,908,893
Patented Oct. 13, 1959

2,908,893

MAGNETIC-SWITCH CROSS-COUPLING MINIMIZATION SYSTEM

Milton Rosenberg, Santa Monica, Witold M. Modlinski, Sherman Oaks, Matthew Arnold Alexander, Pacific Palisades, and George F. Minka, Los Angeles, Calif., assignors, by mesne assignments, to Telemeter Magnetics, Inc., a corporation of California Application March 28, 1955, Serial No. 497,254

7 Claims. (Cl. 340—174)

This invention relates to improvements in magnetic switches of the type wherein switching is achieved by selectively driving certain ones of a plurality of magnetic cores from saturation at one polarity to saturation at the opposite polarity.

Magnetic memories of the type employing arrays of magnetic cores having substantially rectangular hysteresis characteristics are presently finding favor as the memory components in information-handling machines. Such a memory is described in the article entitled The M.I.T. Magnetic-Core Memory, by William N. Papian, published in the Proceedings of the Eastern Joint Computer Conference, Washington, D. C., December 1953 (pages 37–42).

The magnetic-core memory is usually in the form of a square or rectangular array, and the control or selection of cores is made by driving a row and a column. If the memory is of any size, it will be readily appreciated that the number of tubes required attains a sizable value. In an article in the RCA Review, entitled Static Magnetic Matrix Memory and Switching Circuits, by Jan A. Rajchman, volume 13, pp. 183–201, June 1952 issue, there is described a magnetic switch which may be employed to reduce the number of tubes required for driving the magnetic memory. Besides the form of the switch described in this article, consisting of a stack of cores driven from one end, a magnetic switch may also be used which is in the form of an array of cores arranged identically as the memory core array. Selection of a core in the switch is made by selection of a row and column coil, both of which are coupled to the switch core. Such a switch may be seen shown and described in an article by Jan A. Rajchman entitled a Myriabit Magnetic-Core Matrix Memory, found on pages 1407–1421 of the October 1953 issue of the Proceedings of the IRE. A further development in magnetic matrix memory systems is the so-called three-dimensional memory, wherein the memory arrays which are also termed "digit core-plane arrays" are stacked in the manner shown and described in the article entitled Ferrites Speed Digital Computers, by Brown & Albers-Schoenberg, which is found on page 146 in the April 1953 issue of Electronics, published by the McGraw-Hill Publishing Company. The digit core-planes are arranged so that one similarly positioned core in each plane is driven simultaneously to enable either the storage or readout of a word consisting of as many binary bits as the cores which are simultaneously driven. In order to conserve the number of tubes employed, a magnetic switch of the array type is employed to drive each memory array from one edge. A tube drive is also employed in a direction through the planes of the core-plane stack to complete the selection. Such a system may be found described and claimed in an application by Raymond Stuart-Williams et al., entitled Magnetic Core Memory System, filed April 5, 1954, Serial Number 421,142. Since the same relative memory core in each memory plane is to be selected, the same relative switch core in each switch is selected to accomplish the drive thereof. Advantage is taken of this, and the drive to the switch cores in each switch is made by linking the switches serially in a manner to be described below, so that a single set of tubes drives all the selected switch cores simultaneously.

It was found that with this type of arrangement, the output pulse from a switch core at one end of the serially driven switches had a different wave shape than the switch cores at the other end of the switches. The output wave shapes of the intermediate cores also gradually approached that of the worst wave shape, with the extent of such approach apparently being a function of the nearness to the end core having the worst wave shape. These wave shapes indicate a deterioration in the current output from a switch core, which is used to drive a memory core. Increasing or decreasing the drive to the switch cores would not cure this defect. A poor-driving wave shape applied to a memory core is undesirable, because either the memory core will not be sufficiently driven or the amount of drive does not leave the core at the proper position on its hysteresis curve for minimum disturbance by partial drives.

An object of the present invention is to substantially eliminate the deterioration in the current output pulses occurring in a magnetic-core switching system.

It was found, after extensive investigation, that the deterioration which occurred was a cross-coupling phenomenon; that is, other coils which were coupled to the switch cores being driven have currents induced in them which in turn serve to induce currents in the output coils of the driven switch cores which oppose the currents induced therein directly from the switch core.

Another object of the present invention is to eliminate these cross-coupling effects.

Still another object of the present invention is to provide a magnetic switching system wherein the output of the cores which are driven is unaffected by cross-coupling effects.

Yet another object of the present invention is to provide a novel and improved structure for a switching system.

These and other objects of the invention are achieved by terminating the serially connected coils of a switching system which contribute to the adverse cross-coupling effect in such a manner that the terminating impedance is substantially low when current is drawn through that coil. In addition, unilateral impedances are inserted in the serially connected coils which impede the flow of any induced currents therein, which produces any further adverse cross-coupling effects. When current is not drawn through that coil, the value of the terminating impedance and the polarity of the unilateral impedances are made sufficiently high, so that no current will flow in that coil. More specifically, in a switching arrangement, certain ones of the switch coils which couple the cores selected to be driven have the current through them cut off during and after the time of driving the selected cores. In turning over, the cores induce voltages in these coils, and the current which flows is determined by the impedance of these coils. In the standby condition, current is drawn through these coils and impedance is made low in order not to require a large driving source. With this invention, when the current through these coils is cut off the coil itself, as well as the termination of the coil, is made to have an extremely high impedance. In this manner, substantially no current will flow through this coil. Therefore, the cross-coupling with the output coil, the amount of which is determined by the current flowing in the terminating coil, is substantially eliminated.

The novel features that are considered characteristic of this invention are set forth with particularly in the appended claims. The invention itself, both as to its organization and method of operation, as well as additional objects and advantages thereof, will best be understood from the following description when read in connection with the accompanying drawings, in which:

Figure 1:
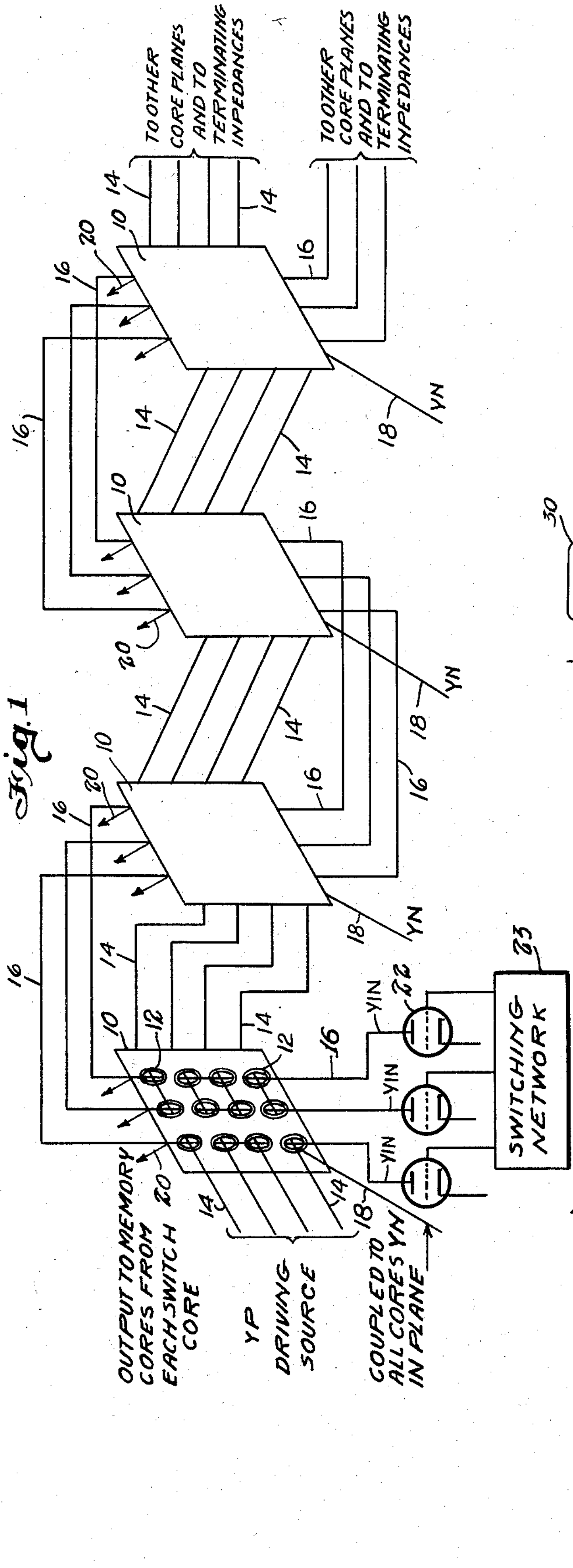
Figure 1 is a block schematic diagram of a magnetic-core switching system which is shown to provide an understanding of the present invention.

Referring now to Figure 1, each rectangle 10 represents an array of magnetic switch cores 12, each of which is employed to drive the cores of a magnetic memory plane (not shown). A magnetic memory plane which is driven by two such arrays is shown and described in the previously referred to article by Jan A. Rajchman in the October 1953 issue of the Proceedings of the IRE, pages 1407–1421, entitled A Myriabit Magnetic-Core Matrix Memory. More specifically, there are in each array rows and columns of magnetic cores, each of which is preferably given a toroidal shape. The cores 12 all have substantially rectangular hysteresis characteristics. A coil 14, hereafter referred to as a driving coil or a $Y_P$ coil, is inductively coupled to each row of cores in an array. Corresponding driving coils 14 of each array are connected in series so that when a $Y_P$ coil 14 is driven, all the cores in the corresponding rows of all the switch arrays receive the same drive. A similar scheme is employed for the columns of cores. A coil 16, which may be referred to as an inhibit coil or $Y_{In}$ coil, is coupled to a corresponding column of cores in each plane in a manner so that when any one of the $Y_{In}$ coils is driven, the corresponding columns of cores in each switch array is driven. A third coil is provided. This comprises a coil 18, which is designated as $Y_N$. This coil serves the function of restoring the cores in each switching array and is coupled to all the cores in a single array and to none other. Each switch core in each of the arrays has an individual output coil 20 which is coupled to drive a row or a column of cores in a magnetic memory, or, in the alternative, may be employed to operate other devices as desired.

A preferred type of operation of the switching system described is to place all the switch cores in a saturated condition at N polarity. During standby operation, each one of the $Y_{In}$ coils is excited with an inhibiting current which maintains the cores of the switch saturated at N polarity. The means of excitation for each inhibit coil consists of a tube 22. When it is desired to drive magnetic memory cores from the switch cores, obviously it is necessary to select the switch core in each array whose output coil is coupled to the memory core in the memory plane. This may be achieved by first cutting off the inhibit current in the $Y_{In}$ coil which is coupled to the switch core in each array, which, in turn, is coupled to the desired memory cores. A switching network 23 is employed to cut off the proper inhibit coil. Such a switching network may consist of any arrangement of gates which are known in the art for effectuating the cutoff of a desired one of a number of conducting tubes. Thereafter, excitation is applied from a driving source (not shown) to the $Y_P$ coil which is coupled to the switch core in each switch, which, in turn, is coupled to the desired memory core.

It may be seen that this drive, which, of course, is made to drive the switch cores towards saturation in P polarity, affects only one core in a row in each switch array. The other cores in the row are held at N saturation by reason of the Y-inhibit coils coupled thereto still being excited. Only the core which is coupled to the $Y_{In}$ coil, where the inhibit current has been cut off, will be driven to P. The switch cores which are driven to P induce a current in their output coils which, of course, drive the memory cores to which they are coupled. After the drive to the selected $Y_P$ coil is terminated, each $Y_N$ coil is driven to restore the switch cores to saturation at their N condition. Then the inhibit coil current is turned on again to maintain the cores at the N-saturated condition against any succeeding drive to one of the other $Y_P$ coils, wherein such core is not selected.

From the above description, it should be appreciated that one switch core in each array is selected and driven to P. Thereafter, that switch core is restored to N. If the memory system is of the coincident-current type, the P-drive to a selected core in a plane from this switch will coincide with the P-drive to that selected core from another source which may be either a magnetic core or tube. Thus, the magnetic memory core is driven to P. The selected switch cores are restored to N by the drive to the $Y_N$ coil. The timing of the restoring operation may or may not coincide with an N-drive from another source applied to the selected memory cores coupled to these switch cores. If a memory core is to be left at P, then the N-drives to that memory core are not made coincident; that is, the drive to the $Y_N$ coil occurs after the drive from the other source, or the other source is not excited at all.

Another type of memory core drive which is preferred may be found described and claimed in an application by Raymond Stuart-Williams et al., Serial Number 421,142, filed April 5, 1954, entitled Magnetic Core Memory System, and assigned to a common assignee. Therein, one drive which is a tube drive to the memory cores in an array, which may be called a long-pulse drive, occurs first. This long pulse is usually in the P polarity. Thereafter, the drive from the switch core occurs in the direction P. If the memory core is to be left in P, immediately after this P drive, the switch core is restored to N. The long pulse is then terminated and then a drive in the N direction from the long-pulse source is applied which is terminated thereafter. If the memory core is to be set in the N condition instead of the switch N drive occurring during the long pulse when it is in the P-going direction, the N drive occurs during the long pulse when it is in the N-going direction.

Figure 2:
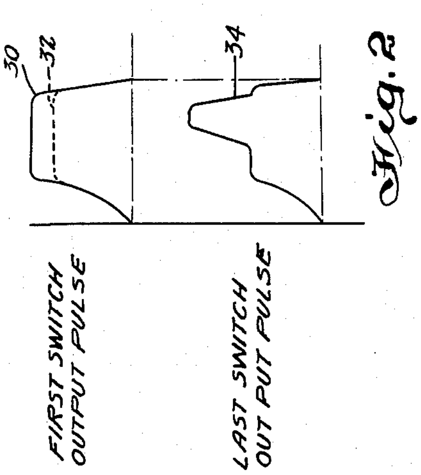
Figure 2 illustrates wave shapes found in the output coils as a result of driving the switching cores.

With the type of switch described, it was found that the serially connected $Y_{In}$ coils as well as the serially connected $Y_P$ coils behave in a manner similar to transmission lines. Propagation effects on application of currents were detected. By proper termination of the coils, the effects of reflection caused by mismatch of the terminating source and other adverse effects were substantially minimized. Similarly, the proper termination of the $Y_P$ coils also resulted in better operation. It was found that upon a $Y_P$ coil being driven, the output wave shape of a selected core in the switching arrays which was nearest to the driving current source had a wave shape 30, as shown in Figure 2. The wave shape for the cores in each successive array as one got further away from the driving source gradually deteriorated until the output of the core in the last switch array resembled the dotted wave shape 32 shown in Figure 2. An increase in the amplitude of the current applied to the selected $Y_P$ coil would not correct this situation. The effect of the deteriorated wave shape was that insufficient current was provided by the switch core to properly turn over the memory core selected or to drive it to the proper point of its hysteresis characteristic, so that the effects of partial drives are minimized.

Upon investigation, it was found that when the selected switch cores turned over current was induced in the $Y_{In}$ coil which was coupled to each one of these selected cores. This induced current from each core flowed toward one end of the series-connected inhibit coils so that the current resulting therefrom was additive in the direction of the terminated end of the $Y_{In}$ line. In other words, each core along a $Y_{In}$ coil is a small generator, and the currents flowing in one direction all add up in that direction. When there are 39 switch arrays in series, the current flowing through the $Y_{In}$ coil as a result of the turnover of the cores coupled thereto is quite substantial. As shown in Figure 1, each $Y_{In}$ coil is driven by a tube 22. As is well known, the impedance of a triode is low when it is in a conducting condition and rises when the tube is cut off. The $Y_{In}$ coil thus acted like a transmission line having one end shorted and with high impedance on the other end. Since high frequency currents are generated in the $Y_{In}$ coil, the shorted transmission line enabled quite high currents to flow. The terminating impedance used for the $Y_{In}$ coils may be a resistor on the order of 400 ohms. Even so large an impedance in a $Y_{In}$ coil was not sufficient to reduce the current flowing in the $Y_{In}$ coil to a value where there was no cross-coupling effect. As a result, the current in the $Y_{In}$ coil would cause a current to be induced in each of the output coils of the cores, which current caused the effects shown in Figure 2. It was found that if the impedance of the $Y_{In}$ coil was raised to an extremely high value, the cross-coupling effect on the switch core output initiated by a $Y_P$ coil drive was substantially eliminated and the output wave shape from the switch cores was not affected.

Figure 3:
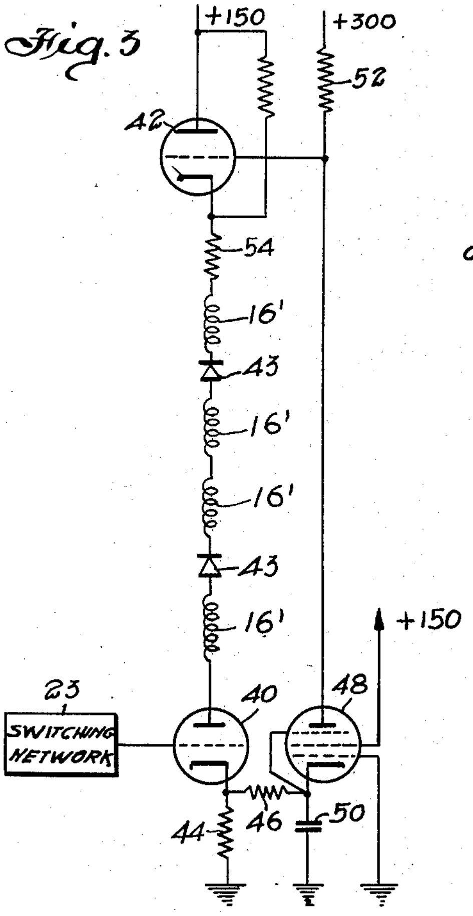
Figure 3 is a circuit diagram of an embodiment of the invention.

To solve the problem of a terminating impedance for a coil which must be low during the time current is drawn through that coil and must be high when current is not drawn through that coil, an arrangement of the invention as shown in Figure 3 was designed. Figure 3 represents the present invention applied to a single inhibit coil for a switching system. It will be understood, as explained in Figure 1, that an inhibit coil here comprises a coil 16' in each switch array which is coupled to a corresponding column of cores in each array. These coils 16' are connected in series to make a $Y_{In}$ coil 16. It should also be understood that the arrangement shown in Figure 3 is repeated for every inhibit coil in the switch. Each series of inhibit coils 16' is coupled serially between a first tube 40 and a second tube 42. Diodes 43 are also inserted in series for reasons which will be given later. The first tube has a cathode load resistor 44 connected between cathode and ground. The first tube corresponds to the tube 22 shown in Figure 1. A coupling resistor 46 is employed which connects the cathode of the first tube with a cathode of the third tube 48. In series with the third tube cathode is a condenser 50 which connects the cathode to ground. The control grid of the third tube is also connected to ground. The anode of the third tube is connected to a 300-volt source of B+ to a load resistor 52. The $Y_{In}$ coil is connected in series with a terminating resistor 54, which may be on the order of 400 ohms. The other end of this resistor is connected to the cathode of the second tube. Between cathode and anode of the second tube is a bleeder resistor which is on the order of one megohm and serves the function of providing a damping impedance when the inhibit coil is turned over. The grid of the second tube is connected to the anode of the third tube.

Figure 4:
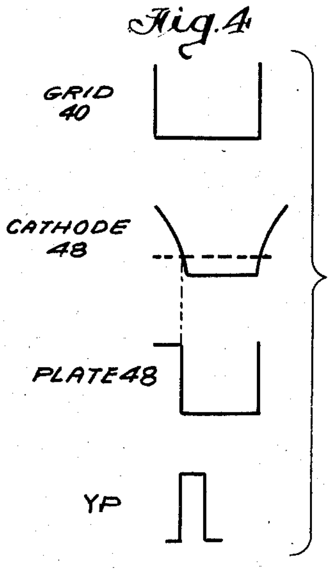
Figure 4 shows wave shapes which are employed in the operation of the embodiment of the invention.

In standby condition, the first and second tubes are conducting; the third tube is cut off by reason of the positive voltage applied to its cathode from the cathode of the first tube. A negative pulse such as shown in Figure 4 is applied to the grid of the first tube from the switching network 23. This cuts off the current flowing through the first tube and also through the inhibit coil. The voltage to the cathode of the third tube is shown in Figure 4. It gradually decreases by reason of the condenser 50, discharging in the negative direction. The third tube cutoff level is shown by the dotted lines in Figure 4, and when the cathode negative voltage falls below that level, the third tube commences to conduct. When it does this, the second tube is cut off by reason of being coupled to the anode of the third tube. The plate voltage of the third tube drops in the manner shown in Figure 4. The reason for using the arrangement shown whereby current cutoff in the $Y_{In}$ coil is obtained by first cutting off the driving tube and then the other terminating tube is so that the line may be completely discharged. As pointed out previously, the $Y_{In}$ coil acts like a transmission line so that opening up both ends does not terminate current flow instantly but can cause current reflections to occur. Allowing one end to be at low impedance dissipates their reflections. Shortly after the voltage of the second tube is cut off, a current is applied to drive the selected $Y_P$ coil. Since the inhibit coil is terminated on both ends by extremely high impedances, substantially no current flows therein as a result of the cores turning over, and no effects are discernible on the output wave shape from the switch cores. As long as the negative pulse from the switching network 23 is applied, the inhibit coil is cut off and has substantially no current flowing therein. As soon as the negative pulse is removed, the first tube commences conduction, thereby cutting off the third tube and enabling the second tube to conduct.

It should be appreciated that the terminating scheme shown in Figure 3 is one wherein the impedance terminating the inhibit coil is low when current is required to flow therein and is high when current-cutoff conditions are provided. It was described previously that the $Y_N$ coil for each switch array is excited for the purpose of restoring to N the selected switch core which had been driven to P when selected. The time of the $Y_N$ drive to a switch core-plane depends upon whether or not it is desired to return the memory core driven by the switch core to N. If not, as previously recited, the $Y_N$ drive occurs during a positive long pulse. If the memory core is to be driven to N, then the $Y_N$ drive occurs during the negative long pulse. It was found that the output pulses from the switch cores in response to the last described $Y_N$ drive also were deteriorated and had the appearance of the wave shape 34 shown in Figure 2. It was also noted that the effect appeared to be a transient one—namely, it would not happen all the time.

Extensive investigation revealed that the effect appeared to be a function of the load. The more memory cores that had to be driven to N, the worse the effect, and vice versa. From this it was further shown that deterioration in the switch core outputs were of not much concern when the N-going output was obtained during a positive long pulse, for the reason that no memory core was being driven at that time. They were being left in P. When a memory core drive to N was required, the switch core output pulse wave shape was critical, since the actual turning over of the memory core was the sum of two N-going drives, the switch providing a part of that sum.

The more switch cores being driven for the purpose of driving the memory cores, the more switch cores there were cooperating in inducing currents in a $Y_{In}$ coil. Although such coil had both ends terminated in a very high impedance, apparently there was still some current flow in the $Y_{In}$ coil which was sufficient to adversely affect the critical N-going output of the switch cores. The reason for the effect being a transient one became apparent; it was a function of the number of switch cores being driven. The effect was linear and became more and more noticeable with an increase in the number of switch cores being driven. This remaining current flow occurred during the time required for flow from a turned-over core (to N) to the end of the coil and back.

It was found necessary to literally break up the inhibit coil, as far as currents induced from switch cores being driven to N by the $Y_N$ coil were concerned. Thus, between one or more of the inhibit coil sections 16', each of which represents the coil coupled to a column of switch cores in an array, a diode 43 was inserted. The more diodes inserted, the better the results. The polarity of insertion of the diodes were such as to permit the flow of an inhibit current but to block the flow of current induced from a switch core being driven to N. The switching system then operated satisfactorily.

In a switching system which was built in accordance with the embodiment of the invention, there were eight inhibit coils and 16 $Y_P$ coils. Each one of the eight inhibit coils was terminated and had diodes inserted as shown in Figure 3, and the switch system operated to provide satisfactory drives for the memory with which it was associated.

It has been found that a substantially similar effect as has been described for the $Y_{In}$ coil occurs when the $Y_N$ coils are driven and the $Y_P$ coils are cut off. That is, as previously described, the switch core provides an output to drive a memory core to saturation in the direction N. As a result of the drive to the $Y_N$ coil, currents are induced in the $Y_P$ coil which can deteriorate the output of the switch cores in substantially the same manner as was described for the inhibit coils. The effect, however, is not as great, but still is noticeable. The same method of terminating the $Y_P$ coil may be employed as was described for terminating the inhibit coil. Also, the diodes 43 may be inserted in the coil as required. The same method of operation is employed, namely, the $Y_P$ coil drive is terminated and the coil impedance is raised to a very high value prior to the $Y_N$ drive being applied. Otherwise, during the time of current conduction, the $Y_P$ coil impedance is low.

It will be appreciated that with forms of the magnetic switch other than a matrix array, the same difficulty may arise, especially where a long series of switches are driven by the same coils and output is taken from one core in each one of these switches in the series.

Figure 5:
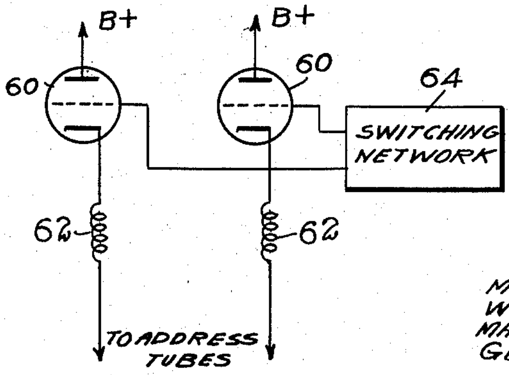

Similar terminations may be employed as described above, also, as an alternative, the ones shown in Figure 5. These may consist of a number of tubes 60. Each tube 60 is at the end of the coil 62, which is coupled to the cores of a switch in a manner to accomplish selection of desired ones of those cores. A switching network 64, which can be driven from the address system of the switch, controls the conduction or nonconduction of the tube 60, so that the terminating impedance of a coil in which current is not flowing is high and in which current is to flow is low. The tube 60 performs a similar function as the tube 42.

Figure 6:
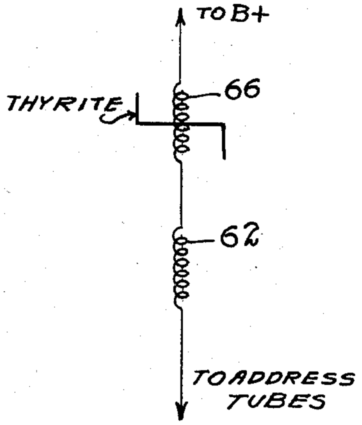
Figures 5 and 6 are alternative embodiments of the invention.

Figure 6 shows another arrangement in accordance with the invention. This may comprise a thyrite element 66, which has a low impedance when current is flowing therethrough and a high impedance when no current is flowing therethrough. Other suitable arrangements may also comprise diodes which are biased to be conducting for coil current conditions and nonconducting when no current flows in the coil.

Accordingly, there has been described herein a new and useful arrangement for a switching system which eliminates the adverse effect on the output from the switch cores which occurs when the switch cores are driven and other coils are present which are coupled to those cores and affect such output adversely.

We claim:

1. In a magnetic switching system of the type having a plurality of core planes each of which has a plurality of magnetic-switch cores arranged in columns and rows, each row of cores being coupled to a separate drive coil, each column of cores being coupled to a separate inhibit coil, each core having a separate output coil, the drive coils coupled to corresponding rows in said plurality of core planes being connected in series to form a plurality of separate series-connected drive coils, the inhibit coils coupled to corresponding columns in said plurality of core planes being connected in series to form a plurality of separate series-connected inhibit coils, means to minimize the cross-coupling reaction of a series-connected inhibit coil upon an output induced in output coils coupled to cores coupled to said series-connected inhibit coil responsive to a drive applied to a series-connected drive coil comprising first, second, and third electron discharge tubes each having an anode, cathode, and control grid, said series-connected inhibit coil being coupled between said first tube anode and said second tube cathode, a resistor coupling said first tube cathode with said third tube cathode, a condenser connected in series with said third tube cathode, means coupling said third tube anode to said second tube control grid, and means to drive said first tube into current cutoff prior to applying a drive to said series-connected drive coil whereby said second tube is also driven into current cutoff.

2. In a magnetic switching system of the type having a plurality of core planes each of which has a plurality of magnetic-switch cores arranged in columns and rows, each row of cores being coupled to a separate drive coil, each column of cores being coupled to a separate inhibit coil, each core having a separate output coil, the drive coils coupled to corresponding rows in said plurality of core planes being connected in series to form a plurality of separate series-connected drive coils, the inhibit coils coupled to corresponding columns in said plurality of core planes being connected in series to form a plurality of separate series-connected inhibit coils, and a separate N-restore coil coupled to all the cores in a core plane, means to minimize the cross-coupling reaction of said inhibiting coil upon an output induced in said output coils responsive to a drive applied to said one of said series-connected drive coils or to drives applied to said N-restore coils comprising at least one diode inserted in each of said series-connected inhibit coils, each of said diodes being poled to block currents induced in a series-connected inhibit coil due to excitation applied to series-connected drive coil, first, second, and third electron discharge tubes for each said series-connected inhibit coil, each of said electron discharge tubes having an anode, cathode, and control grid, each said series-connected inhibit coil being coupled between a first tube anode and a second tube cathode, a separate resistor coupling each said first tube cathode with each said third tube cathode, a separate condenser connected in series with each said third tube cathode, means coupling each said third tube anode to each said second tube control grid, and means to drive a selected one of said first tubes into current cutoff prior to applying a drive to a selected one of said series-connected drive coils whereby the second tube associated with the selected one of said first tubes is also driven into current cutoff.

3. In a magnetic switch of the type including a plurality of magnetic-core planes each consisting of columns and rows of magnetic cores, a plurality of inhibit coils each of which is coupled to all the cores in a different column of cores, a plurality of driving coils each of which is coupled to all the cores in a different row of cores, inhibit coils coupled to corresponding columns in said plurality of core planes being connected in series to form a plurality of separate series-connected inhibit coils, drive coils coupled to corresponding rows in said plurality of core planes being connected in series to form a plurality of separate series-connected drive coils, and a separate output coil for each of said cores, means to substantially eliminate the effects on the outputs from cores of currents induced in a series-connected inhibit coil by a drive applied to a driving coil coupled to said cores comprising a terminating means for each series connected inhibit coil, said terminating means including first and second electron discharge tubes each having anode, cathode, and control grid electrodes, each said series-connected inhibit coil being coupled between a first tube anode and a second tube cathode, means to render a first and second tube conductive to excite the associated series-connected inhibit coil, means to render said first tube nonconductive, and means responsive to said first tube becoming nonconductive to cut off said second tube.

4. In a magnetic switch as recited in claim 3 wherein said means responsive to said first tube becoming non-conductive to cut off said second tube includes a third electron discharge tube having anode, cathode, and control grid electrodes, a resistor connected in series with said first tube cathode, a condenser connected in series with said third tube cathode, means coupling said first and third tube cathodes, an anode load resistor connected to said third tube anode, and means coupling said second tube control grid to said third tube anode.

5. In a magnetic switch of the type including a plurality of magnetic-core planes each consisting of columns and rows of magnetic cores, a plurality of inhibit coils each of which is coupled to a column of cores in each of said core planes, the inhibit coils coupled to corresponding columns of cores in said planes being connected in series to form a plurality of separate series-connected inhibit coils, a plurality of driving coils each of which is coupled to all the cores in a row of cores in each of said core planes, the driving coils coupled to corresponding rows of cores in said plurality of planes being connected in series to form a plurality of separate series-connected driving coils, a plurality of restoring coils each of which is coupled to all the cores in a different core plane, and a plurality of output coils each of which is coupled to a different core in said magnetic switch, means to substantiaaly eliminate the adverse effects on outputs from said output coils by cross-coupling comprising a plurality of unilateral impedances at least one of which is connected in series in each of said series-connected inhibit coils, a plurality of variable impedance means, each of said variable impedance means terminating a different one of said series-connected inhibit and series-connected driving coils, each of said variable means being controllable to provide a first impedance and a second impedance, said second impedance being very much larger than said first impedance, means to control said variable impedance means for each of said series-connected inhibit coils to have said first impedance when current is drawn through a series-connected inhibit coil and to have said second impedance when current is drawn through a series-connected driving coil which is coupled to one of the cores coupled to said series- connected inhibit coil, and means to control said variable impedance means for each of said series-connected drive coils to have a first impedance when current is drawn through a series-connected drive coil and to have a second impedance when current is applied to a restoring coil to restore a core coupled to said series-connected drive coil.

6. In a magnetic switch as recited in claim 5 wherein each of said terminating means includes a first, second, and third electron discharge tube each having an anode, cathode, and control grid, said coil being coupled between said first tube anode and said second tube cathode, a resistor coupling said first tube cathode with said third tube cathode, a condenser connected in series with said third tube cathode, means coupling said third tube anode to said second tube control grid, and means to drive said first tube into current cutoff prior to applying a drive to said series-connected drive coil whereby said second tube is also driven into current cutoff.

7. In a magnetic switch as recited in claim 5 wherein said unilateral impedances are diodes, said diodes are connected into said series-connected inhibit coils between said core planes, and said diodes are poled to impede the flow of current induced due to excitation of said restoring coils.

References Cited in the file of this patent

UNITED STATES PATENTS

| | | |
|---|---|---|
| 2,739,300 | Haynes | Mar. 20, 1956 |
| 2,754,362 | Grosdoff et al. | July 10, 1956 |